July 8, 1941.  E. S. TAYLOR  2,248,791
DYNAMIC DAMPER FOR IN-LINE ENGINES
Filed March 5, 1938
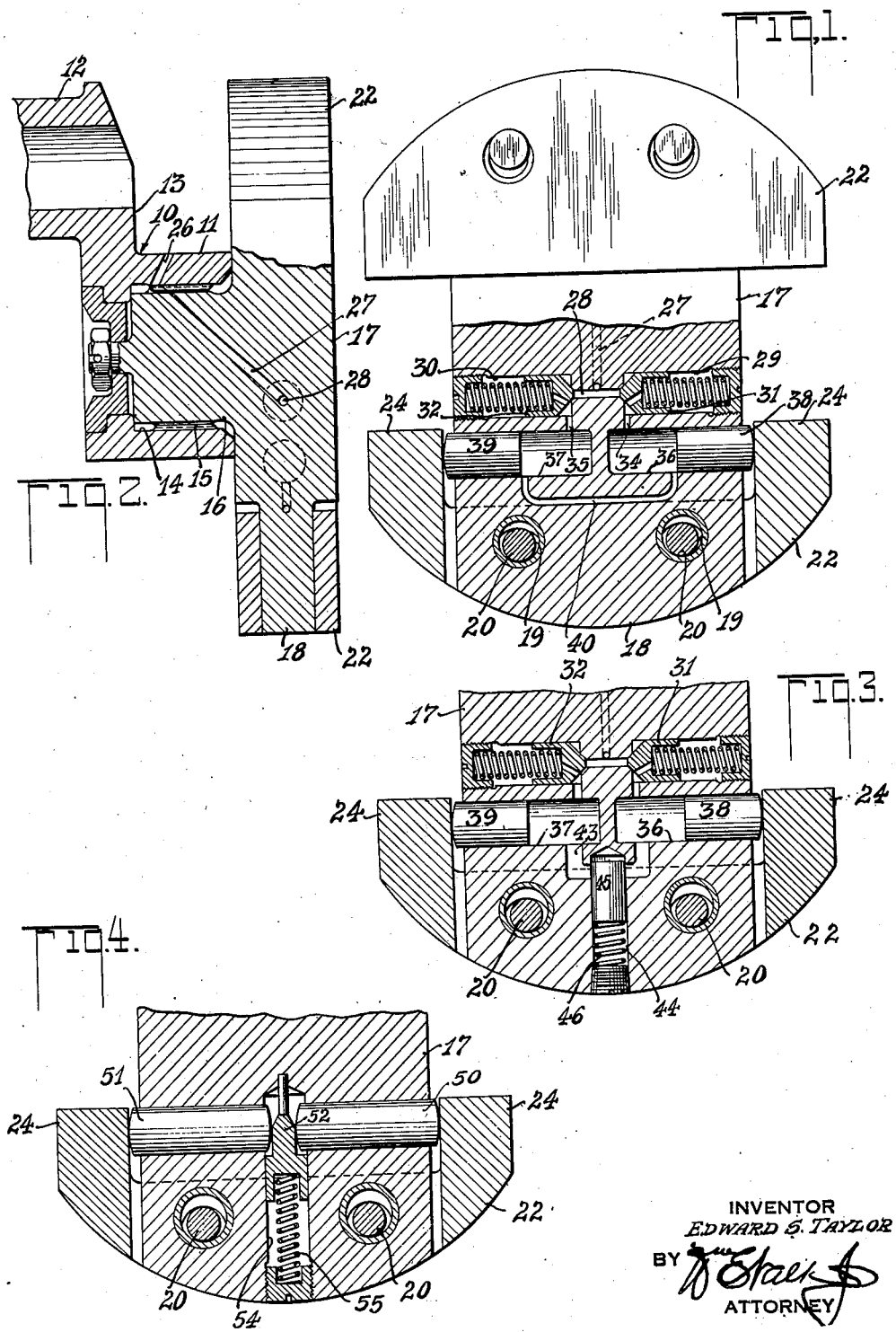
INVENTOR
EDWARD S. TAYLOR
BY
ATTORNEY Patented July 8, 1941

2,248,791

UNITED STATES PATENT OFFICE 2,248,791

DYNAMIC DAMPER FOR IN-LINE ENGINES

Edward S. Taylor, Cambridge, Mass., assignor, by mesne assignments, to Wright Aeronautical Corporation, Paterson, N. J., a corporation of New York Application March 5, 1938, Serial No. 194,069

10 Claims. (Cl. 74—604)

This invention relates to torsional balancing means for engine crankshafts, having as an object the suppression of torsional vibration in the power shaft of an engine as induced by forcing impulses due to the explosions in the engine cylinders. The invention is concerned with improvements in that type of torsion balancer or vibration damper in which the balancing mass is pendulously supported upon a crankshaft extension, the mass having a pendulous frequency substantially equal to the number of forcing impulses per shaft revolution. In a device of this type, the frequency of the balancing mass increases directly with engine R. P. M., as taught in Patent No. 2,112,984, issued April 5, 1938, in the name of Roland Chilton.

In the said Chilton application is shown the type of torsional vibration balancer or damper adapted for use in connection with radial cylinder aircraft engines in which service it has proved eminently satisfactory. It will be realized, however, that in aircraft engines, the torque is approximately proportional to the square of the engine speed, the amplitude of motion of the balancing mass being substantially constant over the speed range. In other types of engines, such as those adapted for automotive and stationary use, engine torque may be substantially constant over a wide speed range or, engine torque may have a wholly disproportionate value with respect to any rotational speed. Under such circumstances, the amplitude of motion of the balancing mass may increase as the inverse square of the rotative speed, which means that the mass must be very large in order to prevent excessive amplitude in its excursions under low speed, high torque conditions. Generally speaking, the vibration balancing mass is unnecessary at low engine speeds, since the low vibration frequencies occurring thereat will not resonate with natural periods of vibration. As a dominant object of a vibration damper is to prevent resonance with consequent destructive stresses, the vibration damper is relatively unnecessary under operating conditions where the forcing impulses due to cylinder explosions are outside of the range of frequency of the engine itself.

Accordingly, an object of this invention is to provide a torsional vibration balancer or damper which is rendered automatically inoperative at low engine speeds, but comes into action at higher engine speeds where vibration damping is desirable.

A further object is to provide a vibration damper whose amplitude of motion is controlled within reasonable limits to various engine operating conditions.

Still another object is to limit the action of the vibration damper at low engine speeds.

The objectives of the invention may be accomplished by applying several different principles, and in the drawing, I have shown three different embodiments which, although they operate somewhat differently, all accomplish the desideratum of controlling the action of the balancing mass according to either speed or torque conditions in the engine. The specific embodiments of the invention may be better understood by reading the annexed detailed specification in connection with the claims, in which:

Fig. 1 is an end view, partly in section, of a crankshaft system including one embodiment of the invention;

Fig. 2 is a longitudinal section of the arrangement of Fig. 1;

Fig. 3 is a fragmentary end section of an alternative embodiment, and

Fig. 4 is a fragmentary end section of another alternative.

Referring first to Figs. 1 and 2, I show the end of a crankshaft 10 including a main journal 11 and a crankpin journal 12 joined by a crank 13. The journal 11 is recessed as at 14, and is provided with splines 15 engaged by coacting splines on a projection 16 forming part of a crankshaft extension 17 which comprises, in effect, a flywheel.

The member 17 is provided with opposed portions 18 of reduced thickness, each having bores 19 within which are seated pins 20 of reduced diameter, the pins supporting on their outer ends a balancing mass 22 which embraces the member 18 and which is provided with inwardly extended projections shown at 24. The openings in the mass 22 engaged by the pins 20 are of larger diameter than the pins, whereby the mass 22 is free to roll upon the pins and sequentially, the pins are free to roll upon the member 18, whereby the mass 22 is endowed with simple pendulum characteristics, the frequency of oscillation of which is dependent upon the difference in diameters of the pins 20, the bores 19, and the bores in the mass 22. According to the teachings of the prior art, as exemplified by said Chilton patent, the mass 22 will have a frequency of oscillation proportional to the rotational speed of the shaft 10, and the pendulum length is so chosen as to endow the mass 22 with a frequency equal to the frequency of forcing impulses imposed upon the crankpin 12 and its neighbors It will be apparent that if the speed of rotation of the shaft 10 is constant, and that if the magnitude of the forcing impulses on the crankpin 12 and its neighbors be varied, the amplitude of vibration of the mass 22 will change accordingly, and the tendency will be for the mass to oscillate over a very wide range with increases in engine torque. This is undesirable, particularly at low speeds, where the damping effect of the mass 22 is not important.

I provide means to damp the excessive excursions of the mass 22 in proportion to the tendency toward increased excursions of the mass. In this connection, the engine is normally provided with a pressure lubricating system for feeding the crankshaft bearings, and the pressure fluid may be fed to a main journal drilling 26 in a manner well known in the art. This drilling communicates with the drilling 27 in the extension 17, the drilling 27 terminating at a cross drilling 28 communicating with opposed valve chambers 29 and 30 in which are spring-pressed check valves 31 and 32 arranged to permit of oil flow from the source of pressure supply but to prevent any return flow. The valve chambers 29 and 30 communicate at 34 and 35 with opposed coaxial bores 36 and 37 in the extension 17, and in the bores are fitted plungers 38 and 39 adapted to contact the inward projections 24 of the mass 22. The bores 36 and 37 are in communication with one another through a restricted passage 40 terminating just inboard of the plungers 38 and 39 when the latter are in a centralized position. Due to the constant feeding of oil under pressure to the bores 36 and 37, the plungers 38 and 39 are urged into contact with the projections 24. Small oscillations of the mass 22 will cause joint reciprocation of the plungers, the fluid in respective chambers 36 and 37 transferring from one to the other through the restricted passage 40. If the excursions of the mass 22 tend to become excessive, the plungers cover the open ends of the passage 40, further restricting the transfer of fluid between the bores, thus damping and restricting the oscillation of the mass. The pumping action set up by the plungers in their bores finds no outlet back to the engine lubricating system due to the check valves 31 and 32, the fluid being enforced to pass through the passage 40. Any leakage of fluid past the plungers is made up by the engine lubricating system when the pressure therein exceeds any instantaneous low pressure condition existing in one or the other of the bores 36 or 37.

By this apparatus, excessive oscillation of the mass 22 is prevented, at any speed, should the torsional forcing impulses become high under conditions of high torque engine operation.

In Fig. 3, I show structure somewhat similar to that above described, the extension 17 including the valves 31 and 32, the bores 36 and 37, the plungers 38 and 39 bearing at their ends on the projections 24 of the mass 22, and a mass suspension system including the pins 20 engaging the enlarged bores in the mass and extension. Communication between the bores 36 and 37 is through a passage 43 opening to the bores 36 and 37 inboard of the range of plunger travel. A substantially radial drilling 44 in the extension 17 crosses the passage 43, and a plug 45 is fitted to this bore and is spring-pressed inwardly at 46 to close off the passage. The tension of the spring 46, along with the mass of the plug 45, is so arranged as to hold the plug in the passage closing position at low rotational speeds whereat the action of the balancing mass 22 is unnecessary. Thereby, the mass 22 is hydraulically locked from movement relative to the extension 17, since engine oil pressure flows, one way, through the valves 31 and 32 and enforces the plungers 38 and 39 into contact with the projections 24. Communication between the bores 36 and 37 is prevented by the valve plug 45 which is in closing position with respect to the passage 43.

When the rotational speed of the engine increases, centrifugal force urges the plug 45 outwardly against the spring 46, opening the passage 43 and thus permitting fluid transfer between the bores 36 and 37 and oscillation of the mass 22. At intermediate speeds whereat the plug 45 is in a position for only partly opening the passage 43, the mass 22 will be partly damped, preventing undue excursions thereof under high torque conditions. If the rotational speed becomes high, the plug 45 will fully open the passage 43 to permit of relatively unrestricted flow between the bores 36 and 37 whereby the action of the mass 22 is virtually undamped. This is permissible under high speed high torque conditions (full load conditions) since the mass of the element 22 will be designed large enough to absorb full power conditions within appropriate limits of oscillation.

In Fig. 4, I show, as before, the extension 17 upon which the mass 22 is pendulously supported by the pins 20. In coaxial bores in the extension 17 are fitted opposed plungers 50 and 51 which, when spread apart, engage the projections 24 on the mass 22. A locking plug 52 is radially slidable in a bore 54 which, when it is spring-pressed inwardly by a spring 55, engages the inner ends of the plungers 50 and 51 to enforce locking of the mass 22. The plug mass and the spring 55 will be so organized as to lock the mass 22 at low rotational speeds, but when the rotational speed becomes high, centrifugal force throws the plug 52 radially outward to unlock the plungers 50 and 51, permitting of free undamped oscillation of the mass 22. So long as the rotational speed is high, the mass 22 may oscillate freely, but as soon as the speed falls, the plug 52 locks the plungers 50 and 51 with consequent locking of the mass.

A further arrangement of the invention consists in a slight de-tuning of the frequency of the mass 22 from the frequency of the forcing impulses, and preferably, the mass frequency may be two percent to fifteen percent slower than the frequency of the forcing impulses. By this means, the vibration absorber may be made to have a very much smaller amplitude of travel at low speed, and a nearly constant amplitude for constant engine torque over a wide speed range. The provisions of the above suggested arrangement are common to the several embodiments shown, and are made determinate merely by adjusting the effective pendulum length of the mass 22 by appropriate proportioning of the diameters of the pins 20 and the mass and extension bores with which they engage.

This invention is not particularly concerned with the mode of supporting the mass 22 for free pendulous movement, the pins 20 being shown merely as a convenient and operative organization. It is not intended that the invention be restricted to the specific form of mass supporting means shown, since other supporting means will be apparent to those skilled in the art, and the provisions of the invention are applicable to balancing masses supported by alternative devices.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In an engine having a pressure lubricating system, a crankshaft having an extension, a counterweight freely pendulously supported thereon for circumferential movement relative thereto in response to torsional vibration, control means for the counterweight comprising opposed plungers in the extension bearing on the counterweight and means to introduce fluid under pressure between said plungers for urging same oppositely outward for contact with said counterweight, and means responsive to the action of centrifugal force for rendering said control means ineffective.

2. In an engine, a crankshaft extension having opposed bores on an axis spaced from the shaft center and normal to a radius of the extension, plungers in said bores, a pressure fluid passage communicating with said bores having check valves therein to establish a one-way flow to said bores, a restricted conduit connecting said bores, and a balancing mass sustained on and freely movable relative to said extension with which said plungers engage to damp the oscillation of said mass relative to said extension.

3. In an engine, a crankshaft extension having opposed bores on an axis spaced from the shaft center and normal to a radius of the extension, plungers in said bores, a pressure fluid passage communicating with said bores having check valves therein to establish a one-way flow to said bores, a relatively unrestricted conduit connecting said bores, a balancing mass sustained on and freely movable relative to said extension with which said plungers engage, and a valve responsive in its operation to decrease in centrifugal force restricting said conduit, to suppress free movement of the mass relative to the extension.

4. In an engine, a crankshaft extension having opposed bores on an axis spaced from the shaft center and normal to a radius of the extension, plungers in said bores, a pressure fluid passage communicating with said bores having check valves therein to establish a one-way flow to said bores, a relatively unrestricted conduit connecting said bores, a balancing mass sustained on and freely movable relative to said extension with which said plungers engage, a plug in said extension movable substantially radially inwardly to close said conduit and movable substantially radially outwardly to open said conduit, and a spring normally urging said plug inwardly.

5. In a shaft system comprising a radial extension having a counterweight suspended thereon for free pendular movement, part of said counterweight embracing the sides of said extension, the extension having opposed lateral bores facing said counterweight parts, plungers in said bores, means to direct fluid under pressure to said bores to urge the plungers outwardly into engagement with said counterweight parts, said bores having a passage therebetween, and means to restrict said passage and openable in response to a selected value of centrifugal force.

6. In a shaft system comprising a radial extension having a counterweight suspended thereon for free pendular movement, part of said counterweight embracing the sides of said extension, the extension having opposed lateral bores facing said counterweight parts, plungers in said bores, means to direct fluid under pressure to said bores to urge the plungers outwardly into engagement with said counterweight parts, said bores having a passage therebetween, and means to constrict said passage to prevent the free flow of fluid from one bore to the other during engine operating regimes wherein the amplitude of counterweight movement would tend to be large.

7. In an engine, a shaft extension having opposed bores on an axis spaced from the shaft center and normal to a radius thereof, plungers in said bores extendible laterally beyond the extension, a counterweight embracing the extension and supported thereon for free oscillation in the rotational plane, portions of said counterweight lying opposite said bores, means for urging said plungers outwardly in their bores for engagement with said counterweight portions for suppression of said free oscillation, and means responsive to centrifugal force to prevent inward movement of said plungers.

8. In a torsional vibration compensator for an oil containing shaft system, a shaft extension rigid with the shaft, a counterweight embracing the extension, means to connect the counterweight to the extension to allow free pendulous movement thereof, said extension having alined bores on each side thereof respectively opening opposite portions of the embracing counterweight, plungers slidable in respective bores engageable with respective counterweight portions, and hydraulic means contained wholly within said extension, and fed from the shaft oil supply, for controlling the freedom of sliding of said plungers.

9. In a torsional vibration compensator comprising a shaft extension and a counterweight member supported thereon for free movement relative thereto in the plane of rotation, said extension having opposed bores therein, plugs in respective bores movable outwardly to engage the member, and means to enforce outward movement of said plugs to lock the member and extension from relative movement, said means including an element movable in response to a predetermined value of centrifugal force, and hence a predetermined R. P. M. of the system, to unlock said plugs to permit of free relative movement between said member and extension.

10. In a torsional vibration compensator comprising a shaft member and a counterweight member supported for free movement thereon, one member embracing the other, opposed plugs slidable in one member engageable with the other, means in the one member to enforce plug contact with the other member to the suppression of relative rotational movement therebetween, and an element in the one member responsive to a determinate centrifugal force to negative the effect of said means to allow of release of the plugs from locking engagement with the other member.

EDWARD S. TAYLOR.